United States Patent
Bowen et al.

(10) Patent No.: US 10,941,894 B2
(45) Date of Patent: Mar. 9, 2021

(54) PIPE SEALING DEVICE AND METHODS OF USING THE SAME

(71) Applicants: Joseph Aaron Bowen, Raleigh, NC (US); Justin Matthew Vance, Holly Springs, NC (US)

(72) Inventors: Joseph Aaron Bowen, Raleigh, NC (US); Justin Matthew Vance, Holly Springs, NC (US)

( * ) Notice: Subject to any disclaimer, the term of this patent is extended or adjusted under 35 U.S.C. 154(b) by 0 days.

(21) Appl. No.: 16/677,738

(22) Filed: Nov. 8, 2019

(65) Prior Publication Data

US 2020/0072403 A1 Mar. 5, 2020

Related U.S. Application Data

(63) Continuation-in-part of application No. 15/907,568, filed on Feb. 28, 2018, now Pat. No. 10,557,261.

(51) Int. Cl.
| | |
|---|---|
| *F16L 55/10* | (2006.01) |
| *F16L 55/11* | (2006.01) |
| *F16L 17/02* | (2006.01) |
| *A47K 1/14* | (2006.01) |

(52) U.S. Cl.
CPC ........... *F16L 55/1108* (2013.01); *F16L 17/02* (2013.01); *A47K 1/14* (2013.01)

(58) Field of Classification Search
CPC .............................. E03F 5/0411; E03F 5/0408
USPC ............................................ 138/89, 90, 104
See application file for complete search history.

(56) References Cited

U.S. PATENT DOCUMENTS

| | | | | | |
|---|---|---|---|---|---|
| 1,226,209 | A | ‡ | 5/1917 | Harris | F16L 55/132 138/89 |
| 1,808,411 | A | ‡ | 6/1931 | Hinkston | F16L 55/132 138/90 |
| 1,850,040 | A | * | 3/1932 | Turner | F16L 55/132 138/89 |
| 1,993,307 | A | * | 3/1935 | Nicholson | F16L 55/132 138/89 |
| 1,997,878 | A | ‡ | 4/1935 | Wagner | F16L 55/132 138/89 |
| 2,299,365 | A | * | 10/1942 | Samuel | F16L 55/132 29/213.1 |
| 2,588,188 | A | ‡ | 3/1952 | Weisman | F16L 55/132 138/89 |
| 2,977,992 | A | * | 4/1961 | Jensen | F16L 55/132 138/89 |
| 3,667,640 | A | ‡ | 6/1972 | Morrow | F16L 55/132 138/89 |

(Continued)

*Primary Examiner* — James F Hook
(74) *Attorney, Agent, or Firm* — NK Patent Law (57) ABSTRACT

The presently disclosed subject matter is directed to an apparatus for releasably sealing a pipe. Particularly, the apparatus comprises a bar that includes an interior, an exterior, a first end that includes external threads, and a second end that includes a stop. The device further comprises a sleeve positioned over a portion of the bar, and a coupling comprising internal threads that couple to the bar external threads. The device includes a compressible gasket sandwiched between first and second adaptors. Advancement of the coupling over the bar external threads increases pressure on the sleeve, which compresses the gasket between the first and second adaptors.

11 Claims, 6 Drawing Sheets

(56) References Cited

U.S. PATENT DOCUMENTS

| | | | | |
|---|---|---|---|---|
| 3,704,729 | A ‡ | 12/1972 | Tomlinson | E03F 7/02 138/90 |
| 4,683,597 | A ‡ | 8/1987 | Taylor, Jr. | A47K 1/14 138/89 |
| 4,865,080 | A * | 9/1989 | Lundquist | B25B 27/0007 138/89 |
| 6,035,898 | A ‡ | 3/2000 | Dominguez | F16L 55/11 138/89 |
| 7,152,631 | B1 ‡ | 12/2006 | Fails | F16L 55/1608 138/97 |
| 10,557,261 | B1 * | 2/2020 | Bowen | E03F 5/0411 |
| 2008/0105321 | A1 ‡ | 5/2008 | Campau | E03C 1/021 138/104 |
| 2009/0308476 | A1 ‡ | 12/2009 | DeMartino | F16L 9/12 138/104 |

\* cited by examiner
‡ imported from a related application

PIPE SEALING DEVICE AND METHODS OF USING THE SAME

CROSS-REFERENCE TO RELATED APPLICATIONS

This application claims priority to U.S. patent application Ser. No. 15/907,568 entitled "Pipe Sealing Device and Methods of Making and Using the Same", filed on Feb. 28, 2018, the entire contents of which are incorporated by reference herein.

TECHNICAL FIELD

The presently disclosed subject matter relates to a pipe sealing device and to methods of making and using the disclosed device.

BACKGROUND

During shower construction and renovation projects, flood tests are commonly performed to analyze the durability of a drain's waterproof features and to ensure that no damage is done to the structure due to water leakage. During flood testing, a shower drain pipe is plugged and water is allowed to sit at a depth of 2-4 inches for 24-72 hours. The water height at the beginning and end of the test is then measured and any substantial differences in depth are indications of a leak. Typically, the shower drain is plugged using an inflatable ball connected to an access chain. In use, the ball is inflated to plug the drain and is dislodged at the end of the test by pulling the chain. However, when the water level is high, the user must put his hand in the standing water to access the chain at the end of the test. The inflatable ball design also requires the water depth to be recorded on the surface of a shower, which can be easily disturbed or removed. Further, the inflatable ball requires an external pump for inflation during use.

Moreover, during drain replacement projects, to seat the drain pipe properly, current methods require pushing up from a crawl space or removing a portion of the ceiling from the floor below. Such methods are time-consuming and typically require more than one person.

It would therefore be beneficial to provide a device that overcomes the shortcomings of the prior art.

SUMMARY

In some embodiments, the presently disclosed subject matter is directed to a device for releasably sealing a pipe. Particularly, the device includes a bar comprising a first end, a second end, and a main body positioned between the first and second ends. The first end is defined by a plurality of screw threads, and the second end is defined by a stop. The device further comprises a compressible gasket sandwiched between a first adaptor and a second adaptor, positioned at the second end, adjacent to the stop. The device includes a coupling comprising a handle and internal threads that mate with the external threads of the bar first end. The device comprises a sleeve configured on an outer surface of the main body of the bar, maintained between the coupling and the second adaptor, wherein advancement of the coupling over the bar external threads translates the sleeve towards the bar second end, which compresses the gasket between the first and second adaptors.

In some embodiments, the gasket is constructed from rubber, elastomeric material, or combinations thereof.

In some embodiments, the sleeve is constructed from a rigid material. In some embodiments, the rigid material is selected from stainless steel, nickel, aluminum, bronze, brass, iron, and combinations thereof. In some embodiments, suitable plastic materials can include polyethylene, polypropylene, copolymers of polyethylene and polypropylene, poly(vinyl chloride), and combinations thereof.

In some embodiments, the sleeve comprises one or more graduation marks that measure a length or depth.

In some embodiments, the coupling is a wing nut comprising two or more wings.

In some embodiments, the stop is defined by a head and a shoulder positioned directly adjacent to the head. In some embodiments, the shoulder is configured in a square shape. In some embodiments, the first adaptor includes a face with a recess sized and shaped to house the shoulder.

In some embodiments, the first and second adaptors each comprise an interior face positioned directly adjacent to the gasket, wherein the interior faces comprise one or more ridges.

In some embodiments, the device further comprises one or more washers positioned between the sleeve and the coupling.

In some embodiments, the device further comprises one or more washers positioned between the first adaptor and the stop, between the second adaptor and the sleeve, or both.

In some embodiments, the presently disclosed subject matter is directed to a method of creating a watertight seal in a pipe, the method comprising positioning the disclosed device within the interior of the pipe and rotating the coupling on the bar external threads such that the sleeve is translated towards the pipe second end until the gasket is compressed between to the first and second adaptors to a degree sufficient to contact the interior of the pipe, whereby the gasket creates a watertight seal in the pipe.

BRIEF DESCRIPTION OF THE DRAWINGS

The previous summary and the following detailed descriptions are to be read in view of the drawings, which illustrate some (but not all) embodiments of the presently disclosed subject matter.

FIG. 1b is a perspective view of the device of FIG. 1a.

DETAILED DESCRIPTION

The presently disclosed subject matter is introduced with sufficient details to provide an understanding of one or more particular embodiments of broader inventive subject matters. The descriptions expound upon and exemplify features of those embodiments without limiting the inventive subject matters to the explicitly described embodiments and features. Considerations in view of these descriptions will likely give rise to additional and similar embodiments and features without departing from the scope of the presently disclosed subject matter.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

As used herein, the term "about", when referring to a value or to an amount of mass, weight, time, volume, concentration, and/or percentage can encompass variations of, in some embodiments +/−20%, in some embodiments +/−10%, in some embodiments +/−5%, in some embodiments +/−1%, in some embodiments +/−0.5%, and in some embodiments +/−0.1%, from the specified amount, as such variations are appropriate in the disclosed packages and methods.

Figure 1A:
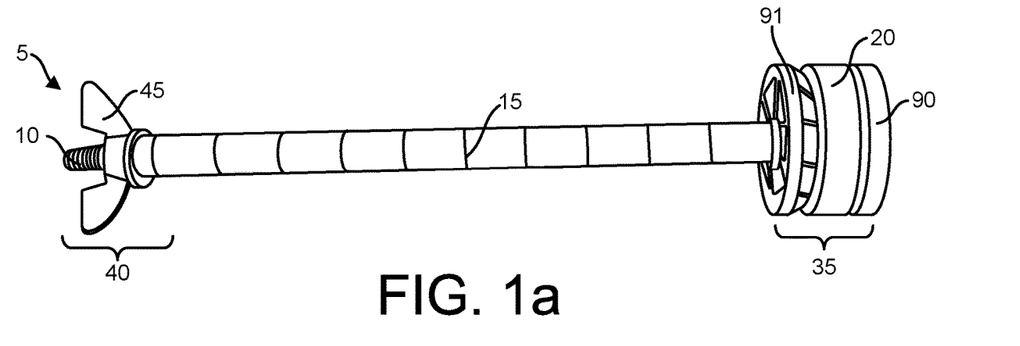
FIG. 1a is a front plan view of a device in accordance with some embodiments of the presently disclosed subject matter.
Figure 1B:
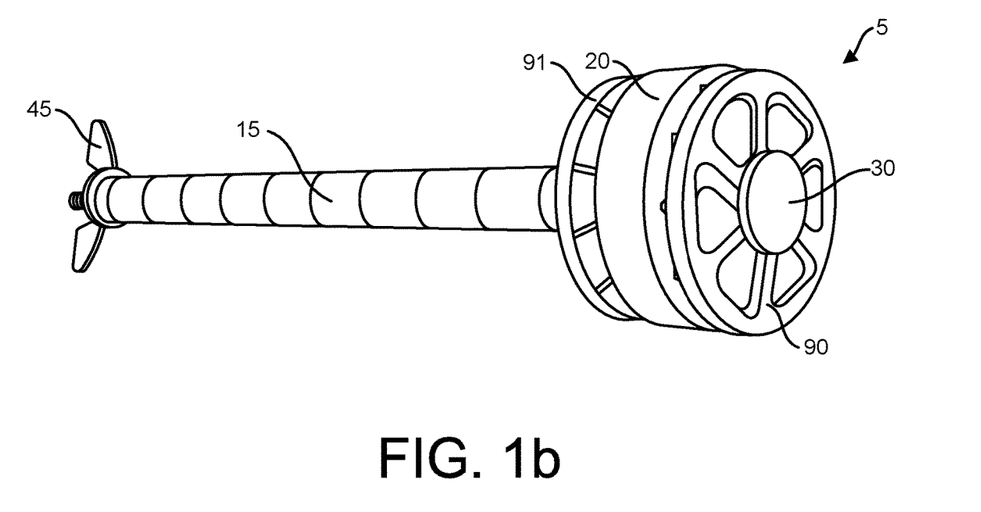

FIGS. 1a and 1b illustrate one embodiment of device 5 comprising bar 10 and sleeve 15 that fits over at least a portion of the bar. The device further comprises gasket 20 sandwiched between first and second adaptors 90, 91 and stop 30 configured at second end 35 of the bar. First end 40 of the device includes coupling 45 that travels down at least a portion of bar 10, towards the second end, as set forth in more detail herein below.

Figure 2:
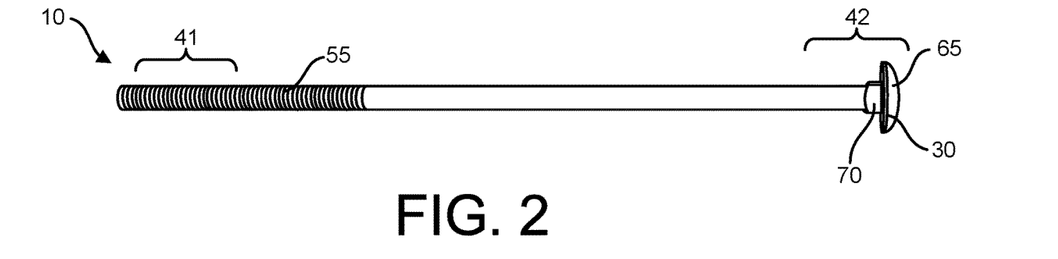
FIG. 2 is a front plan view of a device bar in accordance with some embodiments of the presently disclosed subject matter.

One embodiment of bar 10 having a circular cross-section is illustrated in FIG. 2. However, bar 10 is not limited and can be configured in any desired cross-sectional shape. In some embodiments, bar 10 can have a hollow interior to decrease material costs and to ensure that the device is lightweight. However, the presently disclosed subject matter also includes embodiments wherein the bar is solid, without a hollow interior. As shown, first end 41 of bar 10 includes a plurality of outer threads 55 that mesh with the internal threads of coupling 45. In some embodiments, threads 55 extend partially down the length of the bar (e.g., about 1, 5, 10, 15, 20, 25, 30, 35, 40, 45, or 50% of the length of the bar). It should be appreciated that the disclosed bar is not limited to threads, and any known mechanism can be used to translate coupling 45 down the length of the bar (e.g., any locking and/or sliding mechanism).

Second end 42 of bar 10 comprises stop 30 that holds the first adaptor, second adaptor, and gasket in place, and also prevents movement of the bar during use. In some embodiments, the stop can be configured with head 65 and shoulder 70 positioned directly adjacent to the head. In some embodiments, shoulder 70 can be configured as a square that fits into a corresponding depression on one face of first adaptor 90 to retain the stop in place and keep the bar from moving when the coupling is rotated about the first end of the bar. It should be appreciated that shoulder 70 and the adaptor depression can be configured in any desired shape, so long as they fit together as described herein.

In some embodiments, bar 10 can be a mounting bolt, such as a carriage bolt, lag bolt, or cement bolt. Bar 10 can be constructed with any desired length, such as about 2-30 inches. Thus, in some embodiments, the bar can have a length of about 2, 3, 4, 5, 6, 7, 8, 9, 10, 11, 12, 13, 14, 15, 16, 17, 18, 19, 20, 21, 22, 23, 24, 25, 26, 27, 28, 29, or 30 inches. However, bars with longer or shorter lengths can be included within the scope of the presently disclosed subject matter.

Bar 10 can have any desired diameter, such as about 0.5-5 inches. Thus, the bar can have a diameter of about 0.5, 0.75, 1.0, 1.25, 1.5, 1.75, 2.0, 2.25, 2.5, 2.75, 3.0, 3.25, 3.5, 3.75, 4.0, 4.25, 4.5, 4.75, or 5.0 inches. It should be appreciated that bars with larger or smaller diameters can also be used.

Bar 10 can be constructed from any rigid or semi-rigid material known or used in the art, including (but not limited to) metal, plastic, wood, and/or ceramic materials. In some embodiments, suitable metallic materials can include stainless steel, nickel, aluminium, bronze, brass, iron, and combinations thereof. In some embodiments, suitable plastic materials can include polyethylene, polypropylene, copolymers of polyethylene and polypropylene, poly(vinyl chloride), and combinations thereof. However, it should be appreciated that the materials used to construct bar 10 are not limited, and any rigid or semi-rigid material can be used. The term "rigid" as used herein refers to materials that hold a shape without external support and have a higher resistance to deformation by external forces. The term "semi-rigid" as used herein refers to materials that hold a shape without external support, but exhibit higher flexibility when external forces are exerted upon the structure.

Figure 3:
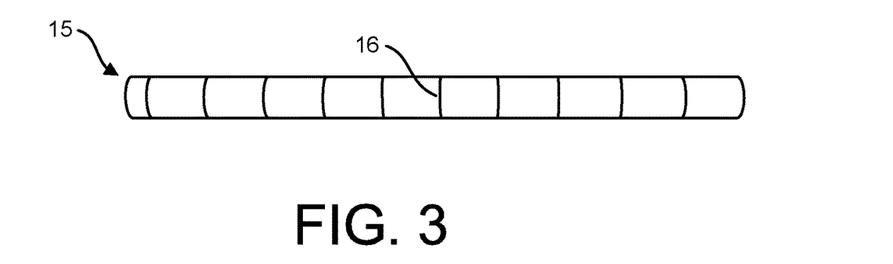
FIG. 3 is a front plan view of a device sleeve in accordance with some embodiments of the presently disclosed subject matter.

As shown in FIG. 3, hollow sleeve 15 is sized and shaped to be positioned over bar 10, between the first and second bar ends. In some embodiments, the sleeve can have a round cross-sectional shape to fit over the bar. However, the shape of the sleeve can be the same or can be different from bar 10. In some embodiments, the length of sleeve 15 can be less than the length of bar 10 to ensure that threads 55 of first end 41 are accessible to the coupling when the device is assembled. Further, the inner diameter of sleeve 15 is configured to be at least slightly larger than the outer diameter of the bar to ensure excess movement of the sleeve is prevented. In some embodiments, the inner diameter of the sleeve is further configured to be smaller than stop 30. The inner diameter is configured to be smaller than the diameter of first adaptor 90, gasket 20, and/or second adaptor 91.

In some embodiments, sleeve 15 can have a length of about 5, 6, 7, 8, 9, 10, 11, 12, 13, 14, 15, 16, 17, 18, 19, 20, 21, 22, 23, 24, 25, 26, 27, 28, 29, or 30 inches. However, sleeves with longer or shorter lengths can be included within the scope of the presently disclosed subject matter.

Sleeve 15 can have any desired diameter, such as about 0.5-5 inches. Thus, the sleeve can have a diameter of about 0.5, 0.75, 1.0, 1.25, 1.5, 1.75, 2.0, 2.25, 2.5, 2.75, 3.0, 3.25, 3.5, 3.75, 4.0, 4.25, 4.5, 4.75, or 5.0 inches. It should be appreciated that sleeves with larger or smaller diameters can also be used.

Sleeve 15 can be constructed from any of a wide variety of materials known or used in the art. For example, in some embodiments, the sleeve can be constructed from one or more metallic materials, such as stainless steel, nickel, zinc, copper, and/or brass. Alternatively, the sleeve can be constructed from one or more polymeric materials, including (but not limited to) polyethylene, polypropylene, poly(vinyl chloride), or combinations thereof. It should be appreciated that the materials used to construct the sleeve are not limited and can include any known rigid or semi-rigid material.

In some embodiments sleeve 15 can include one or more graduation marks 16 to allow the user to measure a length or depth (e.g., water depth during flood testing). For example, the graduation marks can measure depths of about 0.1-30 inches, such as at least about (or no more than about) 1, 2, 3, 4, 5, 6, 7, 8, 9, 10, 11, 12, 13, 14, 15, 16, 17, 18, 19, 20, 21, 22, 23, 24, 25, 26, 27, 28, 29, or 30 inches. Graduations 16 can be added to the sleeve using any desired method, such as printing, engraving, and the like.

As set forth above, coupling 45 is removably positioned on first bar end 50 and includes internal threadings 46 that mate with threads 55 to travel down the length of the bar. Coupling 45 can include any of the wide variety of mechanical implements known or used in the art, including (but not limited to) wing nuts, flange nuts, square nuts, hexagonal nuts, bolts, and the like. Coupling 45 further includes a handle to allow the user to grip and lift the device during use. The term "handle" includes any element that can be used by the user to lift and/or grip the device (such as the wings of a wing nut, a traditional handle, and the like).

Figure 4A:
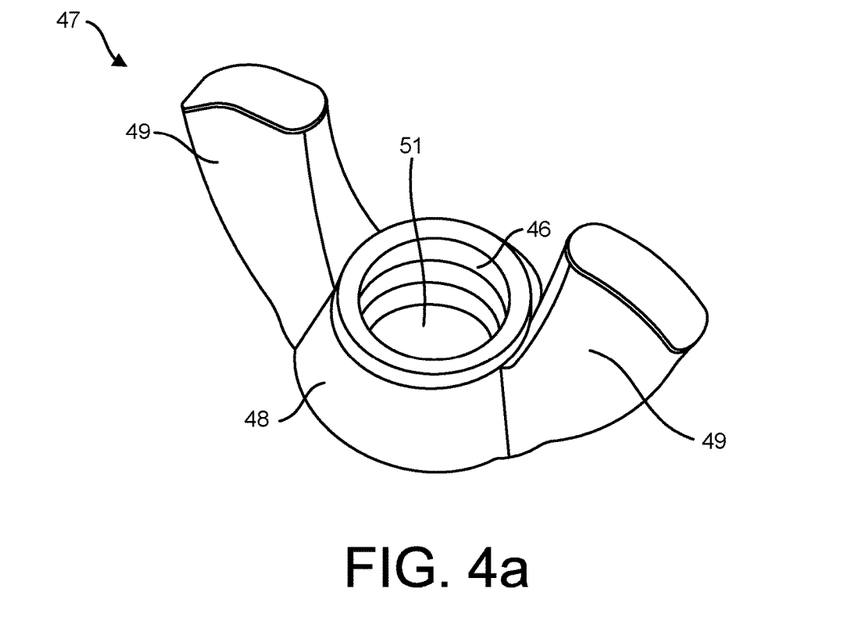
FIGS. 4a-4c are perspective views of three embodiments of couplings that can be used with the disclosed device.

One example of a representative coupling is illustrated by wing nut 47 of FIG. 4a. Particularly, the wing nut includes central barrel 48 and wings 49 that function as the handle and can be used to facilitate rotation of the wing nut. Thus, coupling 45 can include one or more wings 49 (e.g., 1, 2, 3, 4, or 5) to allow the user to easily grasp the coupling during use. The wing nut further includes central opening 51 that is sized and shaped to allow the wing nut to fit over first end 41 of the bar. Particularly, the diameter of the central opening is configured to be larger than the outer diameter of bar first end 41. Opening 51 includes internal threadings 46 that cooperate with external bar threads 55. As set forth in more detail herein below, the coupling can be rotated to travel down the bar threads, thereby exerting pressure on gasket 20. In addition, the coupling can function as a handle to grasp the device in a wide variety of settings, such as during drain seating applications.

Figure 4B:
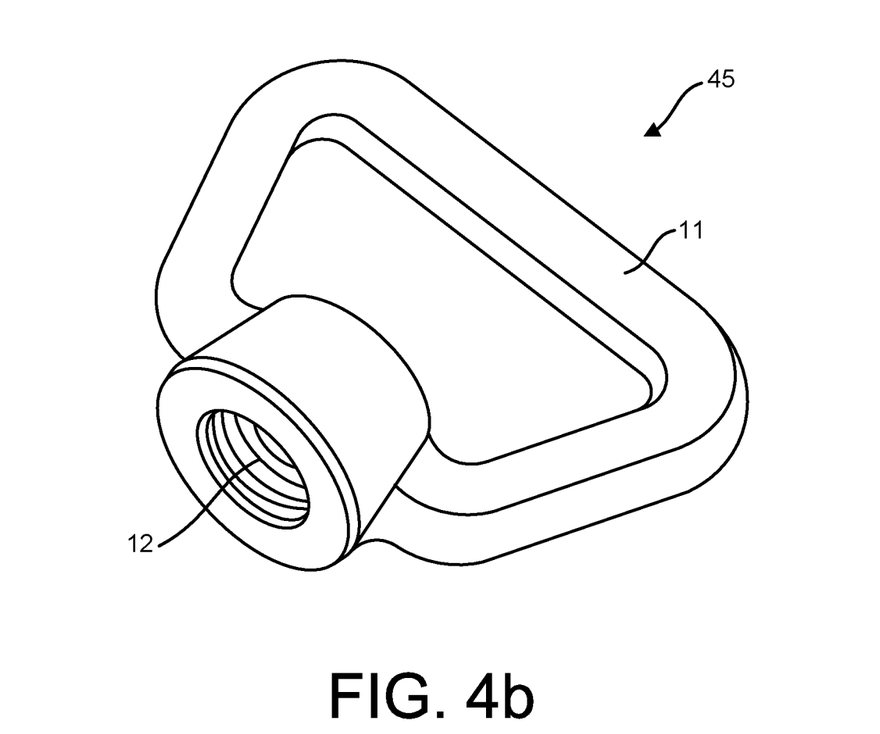
Figure 4C:
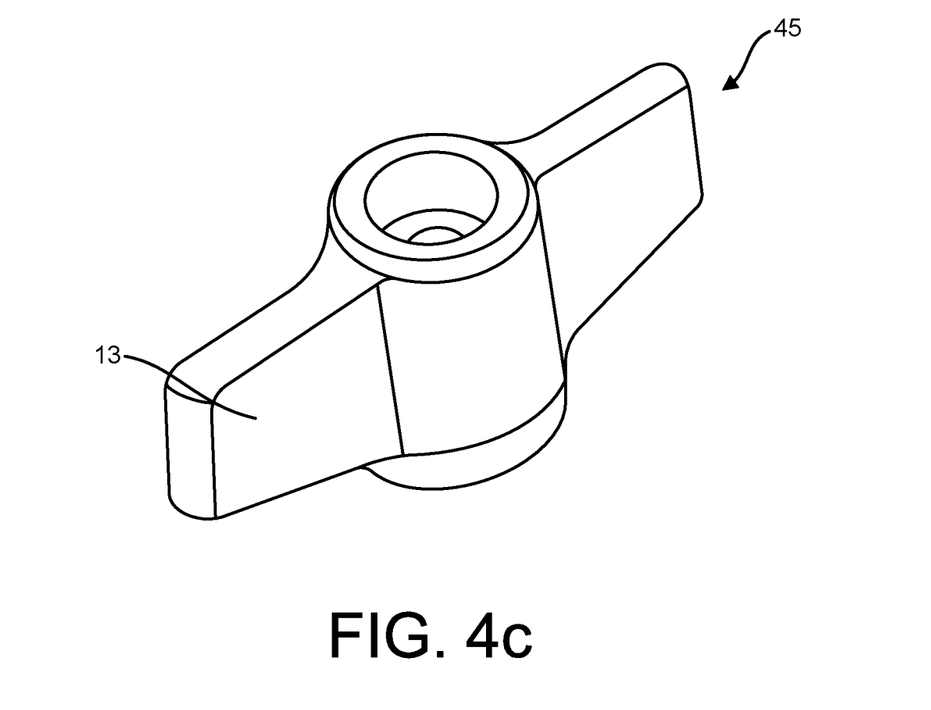

However, the shape and/or design coupling 45 is not limited so long as it can travel down the length of bar 10. For example, in some embodiments, coupling 45 can include handle 11 that can be fully or partially gripped by the user and internal threads 12, as shown in FIG. 4b. FIG. 4c illustrates a further embodiment of coupling 45 that includes one or more flat, planar wings 13 that can function as a handle and can be gripped by the user to advance the coupling down the length of the bar, and internal threads (not shown).

The coupling can be constructed from any material known or used in the art, such as any metallic and/or polymeric materials. Suitable materials can therefore be selected from polyethylene and polypropylene, poly(vinyl chloride), iron, aluminium, stainless steel, nickel, brass, and/or combinations thereof. In some embodiments, coupling 45 can be enlarged in size compared to the sizes typically used in construction projects to allow for use as a handle. For example, in some embodiments, the coupling can have a diameter of about 5 inches or less (e.g., 0.5, 1, 1.5, 2, 2.5, 3, 3.5, 4, 4.5, or 5 inches).

Figure 5:
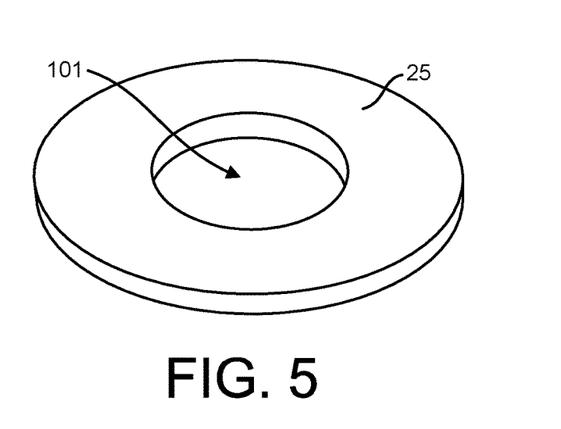
FIG. 5 is a perspective view of a washer in accordance with some embodiments of the presently disclosed subject matter.

In some embodiments, first end 41 of the bar can include washer 25 positioned between the bar and the coupling. The washer ensures uniform pressure is applied from the coupling when traveling down threads 55. As shown in FIG. 5, washer 25 comprises central aperture 101 that is sized and shaped to fit over the bar first end. Thus, the diameter of washer aperture 101 is greater than the outer diameter of bar first end 41. Central aperture 101 can be configured in any desired shape. The washer further functions to resist the force that acts to loosen the coupling. Washer 25 can be constructed with any desired cross-sectional shape (circular, square, rectangular, hexagonal, etc.) so long as it fits over first end 41 of the bar. The washer can be constructed from any desired material (e.g., metallic or polymeric materials) and can be rigid or flexible. It should be appreciated that washer 100 is optional, and the presently disclosed subject matter can include embodiments where the device lacks a washer and the coupling is placed directly on the first end of the bar.

Second end 42 of bar 10 is configured with adaptors 90 and gasket 20. Stop 30 holds the first adaptor, second adaptor, and gasket in place, and also prevents movement of the bar during use. In some embodiments, the stop can be configured with head 65 and shoulder 70 positioned directly beneath the head, as set forth above. Head 65 is sized and shaped to maintain the first adaptor, second adaptor, washer (optional), and gasket on the bar. Particularly, the head is sized to retain the adaptors and optional washer on the bar (e.g., the head cannot fit through the central apertures of the adaptors and washer). In some embodiments, shoulder 70 can be configured as a square that fits into a corresponding depression on one face of first adaptor 90 to retain the stop in place and keep the bar from moving when the coupling is rotated about threads 55. It should be appreciated that shoulder 70 and the adaptor depression can be configured in any desired shape, so long as they fit together as described herein.

Figure 6A:
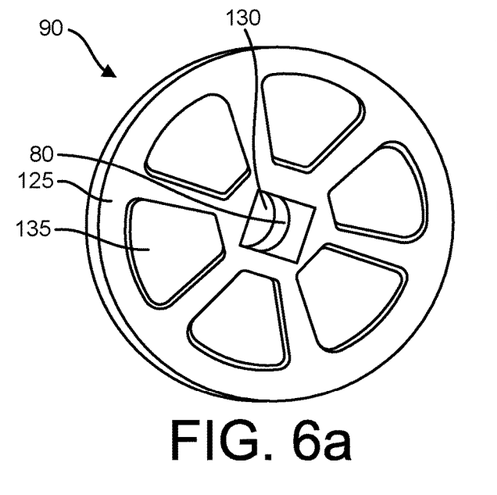
FIGS. 6a and 6b are perspective views of first and second adaptors according to some embodiments of the presently disclosed subject matter.
Figure 6B:
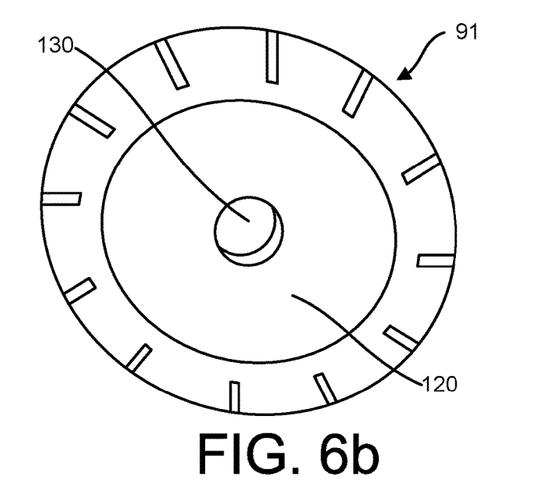

First adaptor 90 and second adaptor 91 are configured such that they sandwich gasket 20 therebetween. As shown in FIGS. 6a and 6b, adaptors 90, 91 each include internal face 120 that is oriented towards gasket 20, and external face 125 that is oriented away from the gasket. Each adaptor further includes central aperture 130 that is sized and shaped to allow bar 10 of the stop to pass therethrough. The central aperture of each adaptor (or at least the first adaptor) is sized and shaped to be smaller than the stop. In some embodiments, the internal face of each adaptor is tapered or angled towards gasket 20. As illustrated in FIG. 6a, external face 125 of the first adaptor can include depression 80 that is sized and shaped to house shoulder 70 of the stop. In this way, the first adaptor and the stop are joined together to prevent the stop from rotating during use. Even though depicted as rectangular in the figures, depression 80 and shoulder 70 can be configured in any desired shape. In some embodiments, the internal and/or exterior adaptor faces can include one or more indents 135 to more evenly distribute the pressure from movement of sleeve 15 to the gasket, as shown in FIG. 6a.

The first and second adaptors can be constructed from any rigid material known or used in the art, such as (but not limited to) metal and/or plastic materials. For example, the adaptors can be constructed from polyethylene and polypropylene, poly(vinyl chloride), iron, aluminium, stainless steel, nickel, brass, and/or combinations thereof. In some embodiments, the adaptors can be configured in the same shape as gasket 20 (e.g., with the same or about the same diameter in the same and/or about the shame shape). However, the adaptors are not limited and can be configured in any desired shape, such as circular, square, rectangular, triangular, hexagonal, abstract, and the like.

Figure 7:
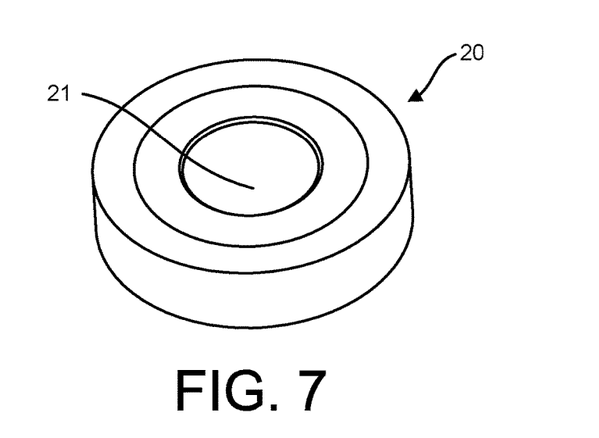
FIG. 7 is a perspective view of a device gasket in accordance with some embodiments of the presently disclosed subject matter.

Gasket 20 can be constructed from one or more compressible materials, such as (but not limited to) rubber or any other elastomeric material. In some embodiments, gasket 20 can be configured as a ring, with a round cross-sectional shape and center aperture 21, as illustrated in FIG. 7. However, the shape of the gasket is not limited. The gasket is designed to provide a watertight seal within a drain pipe, as set forth in more detail herein below.

In some embodiments, second end 60 of the device can optionally include one or more washers 25. In some embodiments, the washers can be flat washers with a circular cross-section and circular center opening, as shown in the washer of FIG. 5. However, any type of washers can be used, such as dome washers, hex washers, ogee washers, fender washers, and the like. Further, the washers can have any desired cross-sectional shape, such as square, rectangular, oval, triangular, hexagonal, and the like so long as they can fit over the stop. In some embodiments, the washer center opening can be sized and shaped to allow shoulder 70 of the stop to pass through (e.g., with a rectangular opening in some embodiments). Washers 25 can be constructed from a wide variety of flexible, rigid, or semi-rigid materials, including (but not limited to) stainless steel, zinc, copper, brass, nickel, plastic, rubber, or combinations thereof. It should be appreciated that in some embodiments, the disclosed device can be configured without washers 25. In some embodiments, at least one washer can optionally be positioned between the stop and the first adaptor. For example, washer 25 can be sized and shaped to fit over shoulder 70 to directly contact stop head 65. In addition, the disclosed assembly can optionally include one or more washers positioned between coupling 45 and sleeve 15.

To assemble the device, first adaptor 90 is positioned on the stop by sliding aperture 130 onto bar 10 until depression 80 abuts stop shoulder 70. Pressure can then be applied mechanically or by hand to fit the shoulder in the depression to lock the stop in place and prevent movement. Gasket 20 is then positioned on stop 30 by sliding the gasket aperture over stop stem 70. Second adaptor 91 is then positioned on the stop stem, such that the adaptor internal face is oriented towards the gasket. Sleeve 15 can then be positioned over the bar such that at least a portion of bar threads 55 extends therefrom. Coupling 30 can be positioned on first end 50 of bar 10 to arrive at the device assembly shown in FIGS. 1a and 1b. Specifically, the internal threads of the coupling cooperate with external bar threads 55 to allow the coupling to travel up and down the length of the bar as desired by the user. The steps recited herein can be performed in any order and are not limited to the precise order of steps described above.

Figure 8:
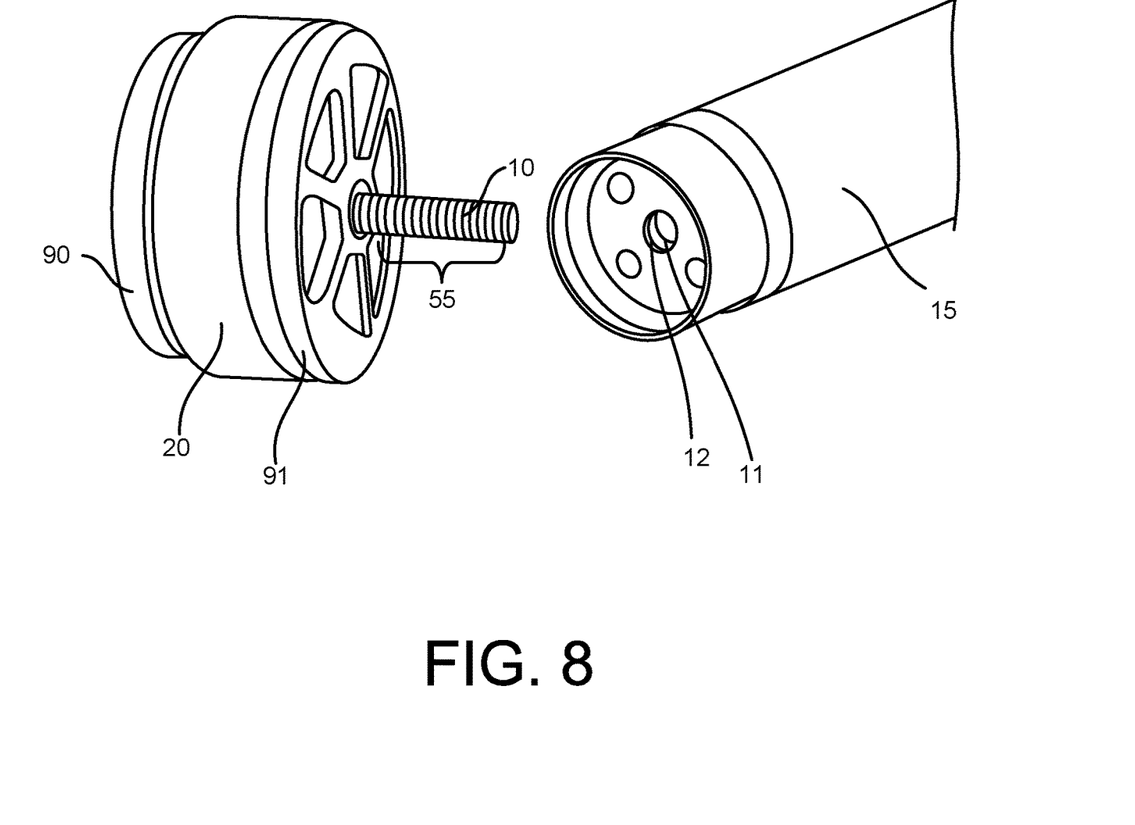
FIG. 8 is a perspective view of a device in accordance with some embodiments of the presently disclosed subject matter.

FIG. 8 illustrates an alternate embodiment of device 5. As shown, bar 10 can be configured to have a length that is less than the length of sleeve 15. For example, in some embodiments, the length of the bar can be about 5, 10, 15, 20, 25, 30, 35, or 40% of the length of the sleeve. Screw threads 55 of the bar first end can be positioned in aperture 11 positioned at one end of sleeve 15. In some embodiments, bar screw threads 55 can cooperate with threadings 12 positioned within the aperture to secure the bar within the aperture. However, it should be appreciated that the bar can be maintained within the sleeve using any method known in the art, including (but not limited to) snap fit, mechanical fit, adhesives, and the like.

The disclosed device can be used during water testing on projects involving a drain. Particularly, the device can be positioned a desired length into a drain, such that gasket 20 is positioned at the desired drain length. First end 40 of the device remains above the drain, allowing the user to access it, using the coupling as a handle. The user activates coupling 30 (which in some embodiments can be an enlarged wing nut) so that it travels down the length of bar 10 via threads 55. The internal threading of the coupling is engaged with mating threads 55 of bar 10, or any other like manner. The user continues to advance the coupling until it abuts sleeve 15. The user continues to advance the stop by rotating wings 49, thereby moving the sleeve towards second end 35 of the device. As the sleeve moves, it exerts direct pressure on the second adaptor which compresses gasket 20 between the first and second adaptors, thereby increasing the diameter as it flattens out to the sides. Because stop is secured into depression 80, the stop does not give in response to the sleeve pressure. As a result, gasket 20 expands out to grip the inside of the drain pipe to create a watertight seal. Thus, the gasket expands to plug the drain. A desired amount of water or other fluid is then added to the drain. The user can measure the water level (e.g., using sleeve graduation marks 16) and the drain is allowed to sit for a desired amount of time.

Figure 9:
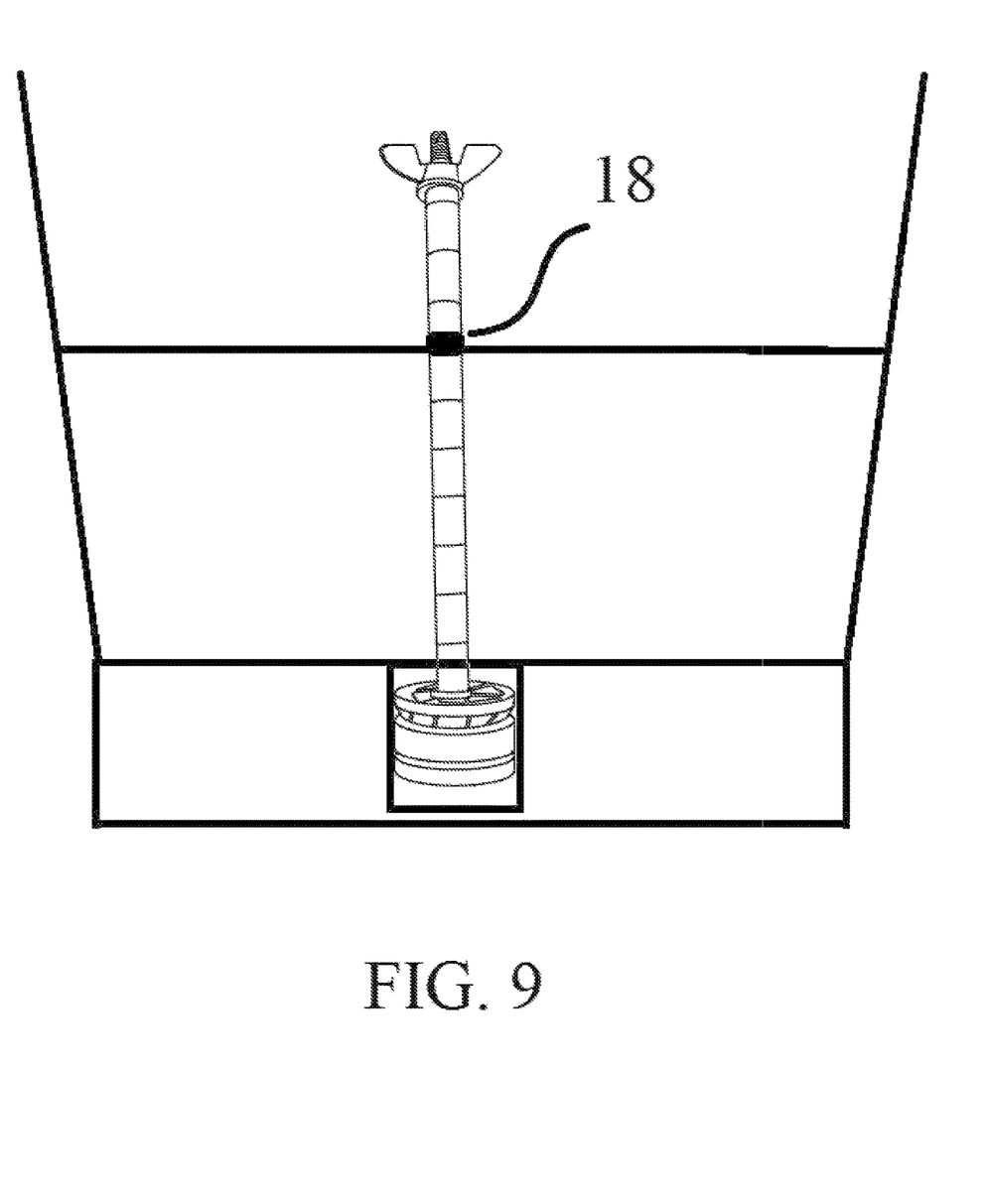
FIG. 9 is a side view of a device installed within a basin according to some embodiments of the presently disclosed

FIG. 9 illustrates one example of a visual indicator 18 for use with the device. The visual indicator 18 is illustrated as a slidable washer assembly, such as an o-ring or sleeve. But any usable visual indicator that is selectively positionable may be employed. In other embodiments, a user could mark on the sleeve with a writing utensil or other in order to mark the water line. The device shown in FIG. 9 includes graduation marks similar to marks 15, however, the sleeve could be without those marks as well.

After a desired amount of time passes (e.g., 1-3 days), the user can again read the sleeve graduation marks to see if the water level is the same or about the same, which is an indication that no leak in the drain pipe is present. To dislodge the device, the process is reversed. That is, the direction of the coupling movement on threads 55 is reversed by rotating in the opposite direction, towards device first end 40. As a result, the pressure put on sleeve 15 is reduced/eliminated, thereby releasing pressure on gasket 20. Consequently, the gasket regains its initial, non-compressed shape (e.g., the gasket is no longer flattened and its diameter is decreased to the normal, non-compressed state). Due to the decreased in the non-compressed diameter of the gasket, it loses its grip on the sides of the pipe wall and the watertight seal is broken. As a result, the user can lift the device out of the pipe and reuse it at a later time.

Advantageously, the disclosed device allows the waterproof quality of a drain pipe to be tested. Recording the measurement at the time of the water test ensures precise water measurement and determination of pan integrity at the time of inspection. No additional materials are required, such as a test ball with extension and/or air pump as are currently used when testing drain pipes. In addition, inspectors can easily check the water levels using the graduation lines, without the need for additional measuring. The user is further not required to reach into stagnant and/or unsafe bacteria-laden standing water to release the pan-fill water.

Instead, the drain is released from above the water line, keeping the user's hands free from contact with the standing water.

The disclosed device further allows a drain body connection to be properly seated and/or glued to a drain line. Specifically, disclosed device can be inserted into a pipe such that gasket 20 is positioned in the drain body. The gasket is expanded as set forth above (e.g., by rotating the coupling towards the device second end) to provide a seal against the sides of the drain. The drain can then be lifted using the disclosed device, where the coupling and/or first end of the device acts as a handle to raise, lower, and/or properly seat the drain. Further, because the gasket is securely maintained against the side of the drain, the user can use the first end and/or coupling of the device to apply pressure to the drain when seating in the proper location. Once the drain is properly seated, the user simply reverses the direction of the coupling, releasing pressure on the gasket and allowing it to return to its normal (non-compressed) diameter. The gasket then loses its grip on the sides of the drain, allowing the user to pull up on the device to remove it from the drain.

As a result, there is no need for a user to open ceilings from below when working on showers located on upper floors. There is further no need to patch, repair, repaint, and/or retexture as would be required with traditional drain installation methods. Use of the device further eliminates the need to go under the house to make a drain connection, and eliminates the need for a second person to go under the house to hold the drain line from below while gluing and seating the new drain body from above. Further, the disclosed device is useful in situations where there is no access from below.

It should be appreciated that all figures herein are not necessarily drawn to scale in each and every embodiment.

What is claimed is:

1. A device for releasably sealing a pipe, the device comprising:
   a bar comprising a first end, a second end, and a main body positioned between the first and second ends, wherein:
   the first end that defines screw threads, and
   the second end is defined by a stop;
   a compressible gasket sandwiched between a first adaptor and a second adaptor, positioned at the second end and adjacent to the stop,
   a coupling comprising a handle and being threadably engaged with the screw threads of the first end of the bar;
   a sleeve configured on an outer surface of the main body of the bar that is maintained between the coupling and the second adaptor,
   a visual indicator selectively positionable about the sleeve to indicate a water level relative to the device after installation of the device, wherein the visual indicator is slideable along a longitudinal length of the sleeve to selectively adjust a position of the visual indicator relative to the pipe;
   wherein advancement of the coupling over the bar screw threads translates the sleeve towards the bar second end, which compresses the gasket between the first and second adaptors,
   wherein, in operation, the compressible gasket sandwiched between the first adaptor and second adaptor is positioned within a drain housing formed within a basin, and the coupling is spaced-apart from the compressible gasket by the sleeve,
   wherein, the coupling remains above a water line formed in the basin and the visual indicator is selectively positioned about the water line to determine a level of water in the basin.

2. The device of claim 1, wherein the gasket is constructed from rubber, elastomeric material, or combinations thereof.

3. The device of claim 1, wherein the sleeve is constructed from a rigid material.

4. The device of claim 3, wherein the rigid material is selected from stainless steel, nickel, aluminum, bronze, brass, iron, and combinations thereof.

5. The device of claim 1, wherein the coupling is a wing nut comprising two or more wings.

6. The device of claim 1, wherein the stop is defined by a head and a shoulder positioned directly adjacent to the head.

7. The device of claim 6, wherein the shoulder is configured in a square shape.

8. The device of claim 1, wherein the first and second adaptors each comprise an interior face positioned directly adjacent to the gasket, wherein the interior faces comprise one or more ridges.

9. The device of claim 1, further comprising one or more washers positioned between the sleeve and the coupling.

10. The device of claim 1, wherein the visual indicator is a resilient washer.

11. The device of claim 10, wherein the resilient washer is an o-ring.

* * * * *